Patented Aug. 3, 1954

2,685,527

UNITED STATES PATENT OFFICE 2,685,527

GLASS COMPOSITION FOR HIGH TENSILE FIBER

Dominick Labino, Waterville, Ohio, assignor to Glass Fibers, Inc., Toledo, Ohio, a corporation of Ohio No Drawing. Application May 7, 1952,
Serial No. 286,620

7 Claims. (Cl. 106—50)

This invention relates to a glass composition having improved properties which render the glass composition particularly suitable for the manufacture of glass fibers, glass paper and so forth.

The production of glass fibers attained by melting glass compositions and passing the melted glass through small openings to obtain molten strands is a known art. In these known processes the extruded strands are blown into long fine staple fibers by passing a molten glass strand through a tubular element, across the exit mouth of which a hot flame containing gases under pressure is applied. The glass strand is melted by the intense heat which may be in the neighborhood of 3000° F. and the molten material is blown transversely to the tubular element by the pressure of the gases and stretches out thereby attaining a much smaller diameter than the original strand. The blown material is then collected on a conveying element moving transversely to the direction of the blown fine staple fibers.

Fibers so produced are useful, to mention a few examples, in the preparation of paper as electrical insulation, heat insulation, and the filtering of fluids. It is desirable for these uses the glass have a high resistance to chemical and physical attack and that the paper made therefrom have a high strength and a high affinity for dust particles.

The attainment of the above noted characteristics is limited by the stringent requirements imposed by the operation of manufacturing the fiber from glass composition. Thus the glass must have a relatively low softening point, preferably less than about 2000° F. and must have a viscosity which will permit it to be worked and extruded readily into streams without solidification of the stream taking place quickly on emanation from the extrusion apparatus. On the other hand, the viscosity must be sufficiently high so that the molten glass does not flood out of the extrusion apparatus preventing the formation of fine filaments. In addition the glass must have a low surface tension which will permit it to be drawn out into long thin strands and then blown into fiber form.

With compositions heretofore known the resolution of the manufacturing requirements has resulted in the attainment of relatively alkali free glasses which yielded fairly satisfactory chemical and water resistant papers having a tensile strength in thin sheet form of about 125 pounds per square inch. Such papers in a standard air flow test of the industry passed only about 1 part of smoke per 90,000 parts. These limitations on the tensile strength of the paper and the noted filtering capacity are imposed primarily by the size of the fibers which are producible from the glass compositions and glass compositions which permit the fiber size and also tensile strength and filtering capacity to be improved are most desirable.

It is accordingly a primary object of this invention to describe a glass composition capable of being formed in extremely small diameters while achieving superior strength and filtration capabilities particularly in thin sheet paper form.

It is another object of this invention to describe a glass composition capable of yielding fibers which in the paper form have a tensile strength of about 250 pounds per square inch.

It is a further object of this invention to describe a glass composition capable of yielding fibers which in paper form pass only about 1 part of smoke per million in the standard air flow test referred to hereinbefore.

The above noted and other allied objectives are attained by a composition having substantially the following limits:

| | Per cent |
|---|---|
| $SiO_2$ | 52 to 56 |
| CaO | 6 to 16 |
| $B_2O_3$ | 8 to 13 |
| $Al_2O_3$ | 12 to 16 |
| ZnO | 5 to 15 |

The boron oxide in this formula serves as a flux and other fluxes may be substituted for a portion thereof, e. g. fluorspar to the extent of about 2% by weight. Sodium oxide may be present without deleteriously affecting the properties of the ultimate fiber as a filter, but should be limited to less than about 1% when electrical resistance of the product is a factor.

Devitrification of glasses is a serious problem during the extrusion thereof since it is customary to extrude the glass at temperatures which are only about 100 to 200° F. above the devitrification point, proper attenuation of the glass generally being best secured at such a temperature range.

This devitrification is influenced by the silica, calcium oxide, zinc oxide and aluminum contents of the glass composition and the proportions indicated above should be maintained in order to prevent such devitrification and the interior fibers which would result from such an action.

With proper observation of the limitations set forth it will be found that the glass composition described attenuates without deleterious devitrification to produce fibers having low diameters of approximately 1 micron from which paper of high tensile strength may be produced.

A specific composition useful for the formation of filters and electrical components is:

| | Per cent |
|---|---|
| $SiO_2$ | 54.95 |
| CaO | 10.0 |
| $B_2O_3$ | 10.65 |
| $Al_2O_3$ | 14.3 |
| ZnO | 9.75 |
| $Na_2O$ | .35 |

An alkali-free glass may suitably have the following proportions:

| | Per cent |
|---|---|
| $SiO_2$ | 53.0 |
| CaO | 12.0 |
| $B_2O_3$ | 11.0 |
| $Al_2O_3$ | 16.0 |
| ZnO | 8.0 | and fibers thereof are similarly useful in thin sheet papers.

Glasses of the present invention are particularly suitable for formation into paper in accordance with the method described in my copending application, Serial No. 247,010, filed September 17, 1951, and assigned to the same assignee as the present invention.

The glasses of the present invention have a low liquid point, that is, about 1900 to 2000° F. and are consequently readily worked.

It will be understood that this invention is susceptible to modification in order to adopt it to different usages and conditions and accordingly, it is desired to comprehend such modifications within this invention as may fall within the scope of the appended claims.

I claim:

1. A glass for use in the production of strands of glass and consisting essentially of the following composition by weight:

| | Per cent |
|---|---|
| $SiO_2$ | 52 to 56 |
| CaO | 6 to 16 |
| $B_2O_3$ | 8 to 13 |
| $Al_2O_3$ | 12 to 16 |
| ZnO | 5 to 15 |

2. A glass for use in the production of strands of glass and consisting essentially of the following composition by weight:

| | Per cent |
|---|---|
| $SiO_2$ | 54.95 |
| CaO | 10.0 |
| $B_2O_3$ | 10.65 |
| $Al_2O_3$ | 14.3 |
| ZnO | 9.75 |
| $Na_2O$ | .35 |

3. A glass for use in the production of strands of glass and consisting essentially of the following composition by weight:

| | Per cent |
|---|---|
| $SiO_2$ | 53.0 |
| CaO | 12.0 |
| $B_2O_3$ | 11.0 |
| $Al_2O_3$ | 16.0 |
| ZnO | 8.0 |

4. As an article of manufacture glass fibers consisting essentially of the following composition by weight:

| | Per cent |
|---|---|
| $SiO_2$ | 52 to 56 |
| CaO | 6 to 16 |
| $Al_2O_3$ | 12 to 16 |
| ZnO | 5 to 15 |
| $B_2O_3$ | |
| Fluorspar | 8 to 13 |
| $Na_2O$ | | the sodium oxide being present to the extent of between about 0 to 1 percent by weight and the fluorspar being present to the extent of about 0 to 2 percent by weight of the composition.

5. As an article of manufacture a paper for use as an electrical insulation material comprising glass fibers consisting essentially of the following composition by weight:

| | Per cent |
|---|---|
| $SiO_2$ | 52 to 56 |
| CaO | 6 to 16 |
| $Al_2O_3$ | 12 to 16 |
| ZnO | 5 to 15 |
| $B_2O_3$ | 8 to 13 |
| Sodium oxide | | said sodium oxide comprising not more than 1 percent of the total weight.

6. As an article of manufacture for use as filter paper intertwisted glass fibers of small diameter consisting essentially of the following composition by weight:

| | Per cent |
|---|---|
| $SiO_2$ | 54.95 |
| CaO | 10.0 |
| $B_2O_3$ | 10.65 |
| $Al_2O_3$ | 14.3 |
| ZnO | 9.75 |
| $Na_2O$ | .35 |

7. As an article of manufacture for use as filter paper intertwisted glass fibers of small diameter consisting essentially of the following composition by weight:

| | Per cent |
|---|---|
| $SiO_2$ | 53.0 |
| CaO | 12.0 |
| $B_2O_3$ | 11.0 |
| $Al_2O_3$ | 16.0 |
| ZnO | 8.0 |

References Cited in the file of this patent

UNITED STATES PATENTS

| Number | Name | Date |
|---|---|---|
| 2,335,463 | Steinbock | Nov. 30, 1943 |

FOREIGN PATENTS

| Number | Country | Date |
|---|---|---|
| 601,470 | France | 1925 |
| 426,129 | Great Britain | 1935 |
| 459,065 | Great Britain | 1937 |
| 476,400 | Great Britain | 1937 |